United States Patent [19]
Singleterry et al.

[11] Patent Number: 6,088,916
[45] Date of Patent: Jul. 18, 2000

[54] METHOD OF MAKING A PUMP HAVING RELIEF VALVE SEAT FREE OF DIRECT STRUCTURAL RESTRAINT

[75] Inventors: Ron C. Singleterry, Sarasota, Fla.; John Zavisa, Murfreesboro, Tenn.

[73] Assignee: Standex International Corp., Del.

[21] Appl. No.: 09/276,624

[22] Filed: Mar. 25, 1999

Related U.S. Application Data

[60] Division of application No. 08/934,162, Sep. 19, 1997, Pat. No. 5,919,033, which is a continuation-in-part of application No. 08/552,234, Nov. 2, 1995, abandoned.

[51] Int. Cl.⁷ ..................................................... B23P 15/00
[52] U.S. Cl. ................................ 29/888.02; 29/888.025; 29/890.126
[58] Field of Search .................... 29/888.02, 888.025, 29/890.122, 890.126; 417/310, 311; 137/543.19, 541

[56] References Cited

U.S. PATENT DOCUMENTS

| | | |
|---|---|---|
| 970,348 | 9/1910 | Osborne . |
| 1,213,710 | 1/1917 | Timpson . |
| 1,775,833 | 9/1930 | Schneider . |
| 1,980,404 | 11/1934 | Harman et al. . |
| 2,233,649 | 4/1941 | Stahl et al. . |
| 2,501,139 | 3/1950 | Patrick . |
| 2,509,958 | 5/1950 | Burn . |
| 2,640,529 | 6/1953 | MacGlashan, Jr. . |
| 2,649,737 | 8/1953 | Hoen et al. . |
| 2,719,055 | 9/1955 | Lauck . |
| 2,736,338 | 2/1956 | Britton . |
| 3,178,805 | 4/1965 | Milo ................................... 29/890.122 |
| 3,404,864 | 10/1968 | Reddy ............................... 29/890.126 |
| 4,558,498 | 12/1985 | Satoh ................................. 29/890.122 |
| 4,602,413 | 7/1986 | Krauss et al. ..................... 29/890.122 |
| 5,680,703 | 10/1997 | Ono et al. ......................... 29/890.126 |

Primary Examiner—Irene Cuda
Attorney, Agent, or Firm—Luedeka, Neely & Graham, P.C.

[57] ABSTRACT

A pump includes a coaxially integrated pump bypass/relief valve element of high density polymer material seats against a hard metallic sleeve that is pressed into a first counterbore around the bypass flow channel with an interference fit. That axial end of the sleeve bearing the valve seat face projects, for a substantial proportion of the sleeve length, beyond the first counterbore shoulder into a second counterbore space to provide an annular space around the outside diameter surface of the sleeve to free the seat face end of the sleeve from direct structural restraint.

16 Claims, 4 Drawing Sheets

METHOD OF MAKING A PUMP HAVING RELIEF VALVE SEAT FREE OF DIRECT STRUCTURAL RESTRAINT

CROSS REFERENCE TO RELATED APPLICATION

This application is a divisional application of U.S. Ser. No. 08/934,162 filed Sep. 19, 1997 now U.S. Pat. No. 5,919,033 which is a continuation-in-part of application Ser. No. 08/552,234 filed Nov. 2, 1995 and now abandoned.

BACKGROUND OF THE INVENTION

The present invention relates to valve construction. More particularly, the invention relates to an improved bypass/relief valve integral with a potable liquids pump.

Vane type pumps are often used by the beverage, food and health industries for quietly transferring potable liquids at moderately high pressures and volumetric flow rates. For example, vane pumps are used to spray water into a carbon dioxide atmosphere tank at 200 to 250 psi as a step in the production of carbonated beverages.

One particular design of vane pump provides a shunt flow channel between the suction and discharge conduits of the pump. Flow through this shunt is differentially controlled by coaxial valve elements. An axial bore along the relief valve plug element is flow directionally rectified by a spring biased poppet element at the discharge port end of the shunt. This, in effect, is a check valve with a spring loaded cracking bias by which fluid flow bypasses the pump rotor from the suction port directly into the discharge port when suction side pressure exceeds the pump discharge port pressure.

The discharge port relief valve plug is held against a closure seat by an adjustably loaded compression spring that opposes the pump discharge pressure. Compression preload on the relief valve spring is adjusted by an axial displacement of the spring seat. The spring is seated on a screw threaded plug which is advanced or retarded by manual rotation. When the discharge pressure forces on the plug seat cross-sectional area exceed the preload force of the seating spring, the plug moves away from the valve seal face thereby permitting pump discharge fluid flow to recirculate directly back into the pump suction conduit.

Pumps manufactured for sanitary applications such as in fast food restaurants, hospitals or for food processing frequently are made with brass bodies and use brass plugs in the relief valve conduit. While this design has generally performed well for many years, there is a recent demand for greater pump reliability, especially in soft drink fountain applications. It has been determined that the relief valve in this pump is a statistically substantial source of failure. The metal-to-metal valve element combination with cooperating soft metals tends to leak a minute amount but such leakage has little or no apparent effect on pump operation. Once leakage flow begins, erosion exacerbates the defect and the initial small leak develops into a catastrophic failure effectively rendering the pump unusable.

A different cause of the same result arises from inaccurate or defective machine tools that turn, bore and cut imprecise or irregular shapes and surfaces. Relative to the present interest, if a relief valve seat or plug face is out-of-round the pair cannot cooperate to form a fluid-tight seal and small leaks quickly grow into large leaks.

It is an objective of the present invention, therefore, to provide a relief valve design and construction for potable fluid vane pumps having greater accuracy in the shape of the valve sealing surfaces.

Another object of the invention is to provide a relief valve design and construction in which one of the valve sealing elements is significantly softer than the other seal element.

A further object of the invention is to disclose a valve plug material that, relative to the valve seat, is softer and tougher.

SUMMARY OF THE INVENTION

The foregoing objects and others to become evident from the following drawings and detailed description are accomplished by a pump having the suction and discharge ports connected together by a relief flow conduit. At the relief flow conduit juncture with the suction port, two, stair stepped counter bores are provided to receive a thin-walled sleeve having an axial length that is preferably about 30% or more longer than the press-fit penetration of the sleeve into the deeper, smaller diameter counterbore. A valve seat is formed around the inside diameter of the sleeve at the projecting end thereof. The projecting end of the sleeve is not directly constrained by either of the counter bores, and even if the counter bores are oval or otherwise non-circular in cross-section, the projecting end of the sleeve will maintain its circular cross-sectional shape. As will become more apparent from the discussion below, the projecting end of the sleeve forms part of the valve and by remaining more precisely circular, it greatly reduces a type of leakage failure that was common in prior pumps.

Confined within the sleeve bore for axial reciprocation therein is a tubular valve plug. Plug characteristics include an axial throughbore and an outside diameter shoulder near one end of the plug. A conical valve seat face is formed into the shoulder step. Below the seat face, the plug tube outside wall may be longitudinally ribbed or given a non-circular geometric section such as a square or triangle. Such outside tube wall sections provide longitudinal fluid flow channels between the valve plug outside wall and the inside wall of the sleeve bore when the plug seat face separates from the sleeve seat.

A helical compression spring seated at one end thereof against the valve plug and at the other end against a threaded plug provides a selectively varied preload against the valve plug to hold the plug seat sealed against the sleeve seat in opposition to the desired magnitude of discharge pressure force. When the discharge port pressure exceeds the spring preload force, the valve plug is moved against the spring bias thereby opening the valve seat seal to allow fluid flow from the discharge port to the suction port.

The internal throughbore of the tube is undirectionally closed by a tension spring biased poppet plug at the discharge port end of the plug tube. Fluid system conditions resulting in a greater pressure in the suction port than in the discharge port will permit fluid to bypass the pump vane for direct flow into the discharge port.

DETAILED DESCRIPTION OF THE PREFERRED EMBODIMENT

Figure 1:
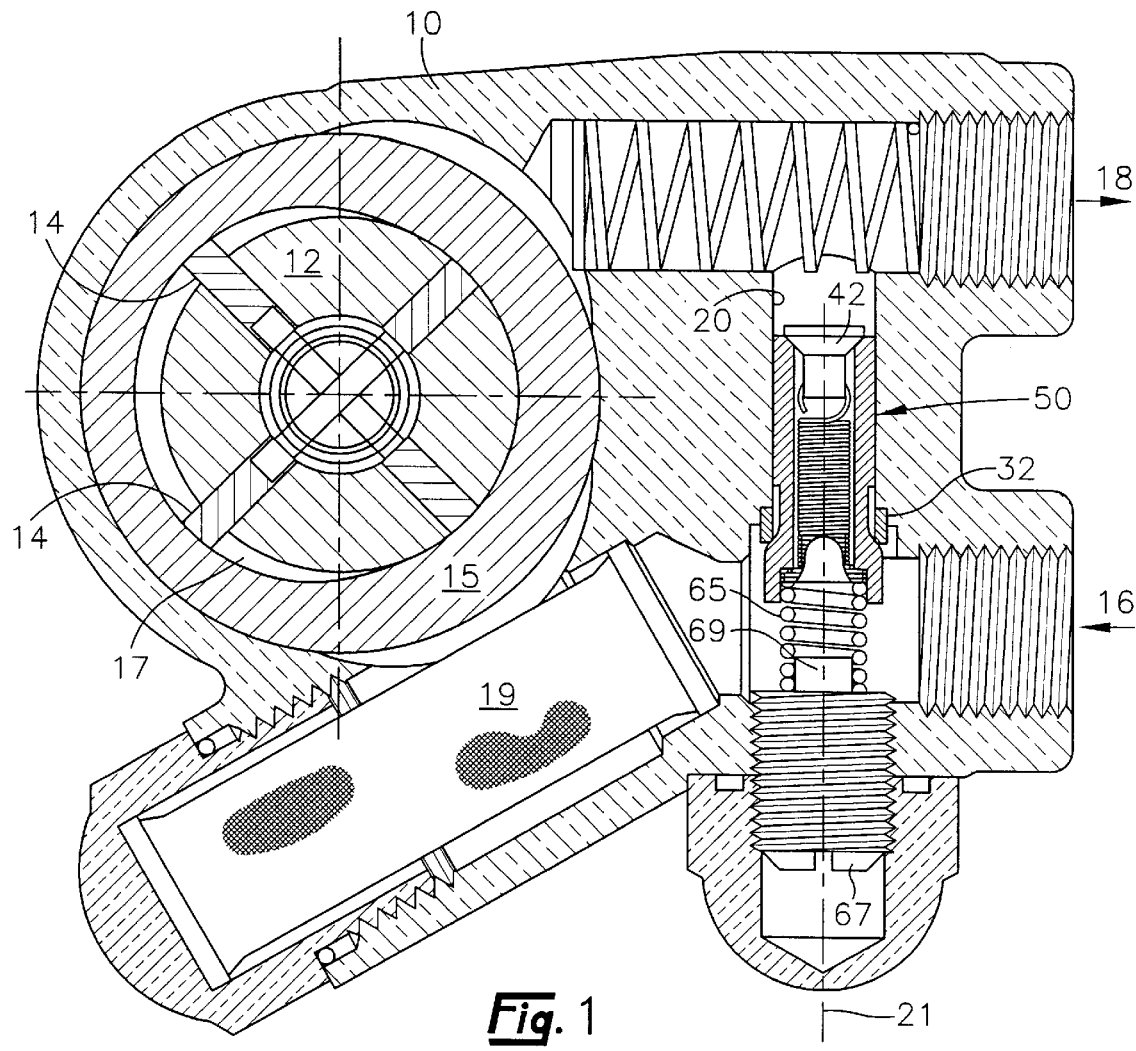
FIG. 1 is a sectional view of a traditional vane pump incorporating the present invention.

Relative to the drawings wherein like reference characters designate like or similar elements throughout the several figures of the drawings, FIG. 1 illustrates a traditional vane type pump having a pump body 10 with a rotor 12 and vanes 14 rotating within an eccentric sleeve 15. Usually, the pump body is forged or cast of brass or stainless steel although aluminum and plastic have been used. A suction port 16 channels fluid into the eccentric chamber 17 where it is transferred by the rotating vanes 14 into the discharge port 18. A finely meshed screen filter 19 captures particulate contaminants before reaching the pump eccentric chamber 17. Pipe or tubing connector threads are cut into the suction and discharge port entrances to receive the connectors of external fluid conduits.

Figure 4:
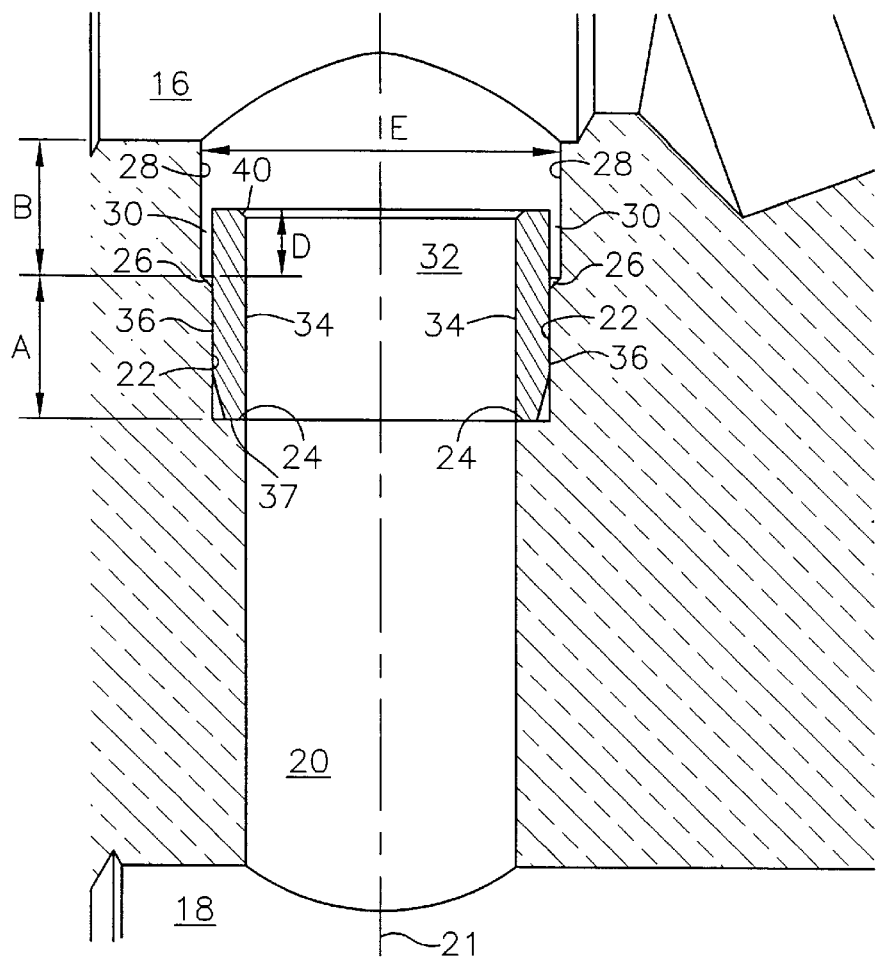
FIG. 4 is an axially sectioned view of the pump bypass conduit.
Figure 5:
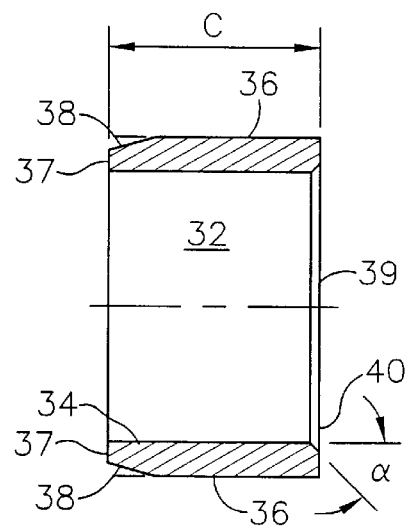
FIG. 5 is an axially sectioned view of the bypass conduit sleeve insert.

Between the suction and discharge ports is a cylindrical bypass conduit 20 drilled or bored along the axis 21. With respect to FIGS. 4, 5 and 6, the junction of conduit 20 with the suction port 16 is double counterbored, coaxial with the axis 21. A first counterbore provides a cylindrical wall 22 which is terminated at its deep end upon a seating shoulder 24. The outer end of the cylinder wall 22 terminates at an intermediate shoulder 26 and defines the first counterbore depth A. The deep end of the second counterbore cylinder wall 28 also terminates at the intermediate shoulder 26 with a minimum wall height of B.

Seated in the first counterbore with a pressfit wall engagement is a valve seat sleeve 32. The sleeve preferably is a cylindrical turning of stainless steel having an inside wall 34 diameter substantially corresponding to the bore diameter of conduit 20. The outside wall 36 has a diameter that corresponds with a pressfit engagement with the wall 22 of the first counterbore. The inner end 37 partition of the sleeve outer wall 36 has an approximately 10° tapered section 38 to controllably start the pressed insertion which terminates with abutment of the sleeve inner end 37 against the shoulder 24.

The outer end 39 of the sleeve 32 carries a conical valve seat 40 having a conical face angle a of about 45.5° to 47.0°. An axial length difference D between the overall axial length C of sleeve 32 and the first counterbore depth A represents about 30% or more of the axial length of the sleeve C. The radial width of intermediate shoulder 26 provides an annulus 30 of space between the inside diameter of the second counterbore wall 28 and the outside diameter of the outside wall 36 of the sleeve. This annulus of space 30 separates that portion D of the sleeve projected into the annular space 30 from any structural restraint. If the sleeve 32 wall circles are true, when fabricated, the valve seat 40 at the projected outer end of the sleeve is likely to remain a true circle even if the first counterbore wall 22 is slightly eccentric. The circularity of the valve seat 40 is important to eliminating premature failure of the seat 40 and/or plug 50.

The distance D is chosen to insure that the shape of valve seat 40 on the projected end of sleeve 32 will remain circular. While the minimum distance D will change depending on the pump size and the materials and tolerances used, a typical acceptable distance D is about 0.17 in. for a brass pump body 10 and an approximately 0.50 in. long (dimension C) stainless steel sleeve 32 having an outside diameter E of about 0.42 in.

A preferred projection distance D may also be determined as a function of the diameter E of the projected end of the sleeve 32. By this relationship, the projection distance D should be about 20% to about 40% of the sleeve 32 diameter E.

Figure 10:
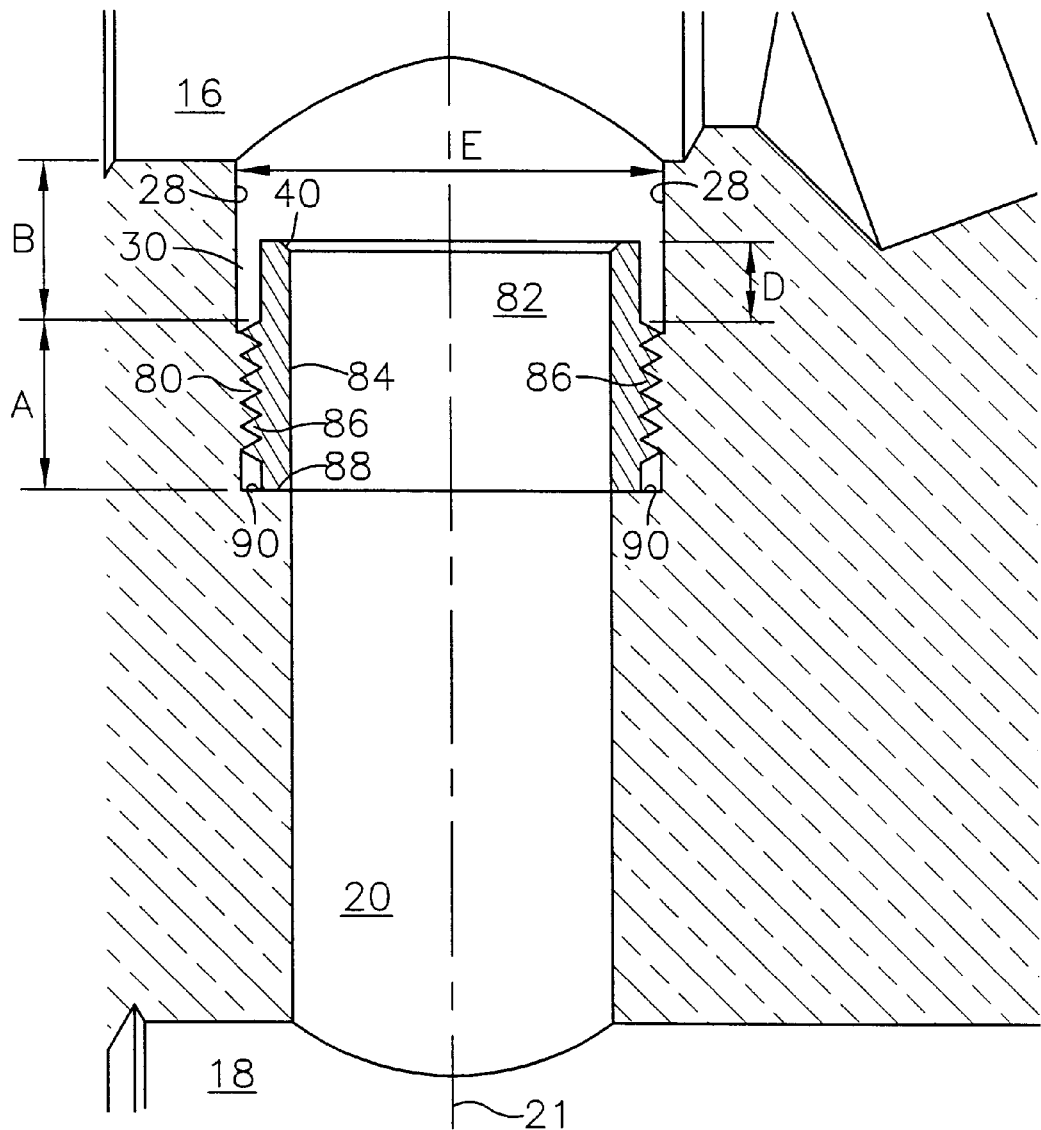
FIG. 10 is an axially sectioned view of an alternative embodiment of invention.

An alternative embodiment of the invention as shown by FIG. 10, illustrates the sleeve 82 as having external threads 86 to mesh with internal threads 80 cut into the body of the pump 10 below the end of the second counterbore 28. The engagement between threads 80 and 86 is wound to full face engagement between the end wall 90 of the thread bore extension and the end face 88 of the threaded sleeve 82. As to with the press fit embodiment of the invention, the internal bore wall 84 of the threaded sleeve is sized for a smooth continuation of the bypass conduit 20 wall.

It is also anticipated that the assembly of either a press fit sleeve embodiment or a threaded sleeve embodiment may be enhanced or secured by the use of polymer adhesives such as epoxy. In any case, it is important for the lower end plane 39 of the projected end of the sleeve to be substantially perpendicular to the conduit axis 21 in addition to being a true circle.

Figures 2, 3:
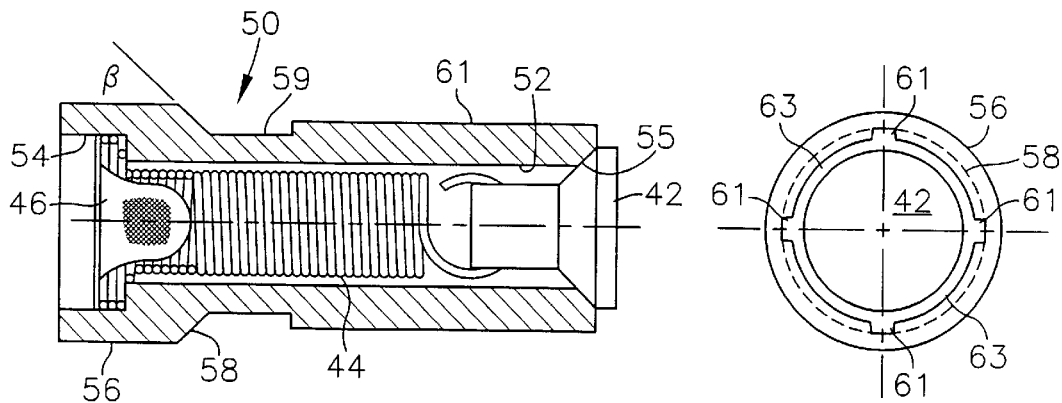
FIG. 2 is an axially sectioned view of a bypass-relief valve plug.
FIG. 3 is an end view of the bypass-relief valve plug.

The valve plug 50 shown by FIGS. 2 and 3 to cooperate with the bypass conduit 20 and sleeve 32, is preferably fabricated from the General Electric proprietary high density polymer, Ultem®. This plug features an axial throughbore 52 having a counterbore 54 at the suction port end and a poppet valve seat 55 at the discharge port end.

External surfaces of the valve plug 50 include an enlarged cylindrical shoulder 56 transitioned by a conical valve seat section 58 into a smaller, cylindrical waist section 59. The conical angle β of the valve seat is preferably about 45° or about 0.5° to 2.5° less than the conical valve seat face 40 of the sleeve 32 to assure a sharp, sealing circle. The remaining approximately half length of the plug is given a substantially circular cross-section 63 having longitudinal ribs 61. The ribs 61 contact the bypass conduit 20 walls as guides and spacers to keep the plug 50 co-axially aligned within the conduit bore. Fluid flows along the outside surfaces of the plug channels between the plug cylinder elements 63 and the conduit 20 bore walls.

Figure 9:
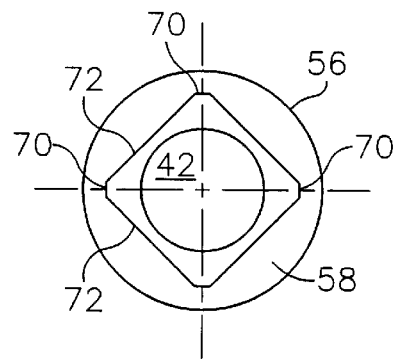
FIG. 9 is an end view of the bypass-relief valve plug having a square cross-section.

It will be understood that other geometric shapes for the plug ribbed section may be used such as a triangle section or square section as illustrated by FIG. 9. This square section valve plug embodiment is guided or centered within the bypass conduit bore 20 by the chamfered corners 70 of the square which provides flow channels between the channel bore 20 and the flats 72 of the square.

The throughbore 52 of the plug 50 is undirectionally closed by a flow rectifying poppet valve 42 that is biased to the closed condition by a tensile spring 44. Normally, pressure will be greater in the discharge port 18 than in the suction port 16. Under such normal pressure differential conditions, the differential magnitude holds the poppet 42 against the valve seat 55 for a fluid seal.

In the unusual circumstance when suction port 16 pressure exceeds discharge port 18 pressure by a differential amount dictated by the tensile force of spring 44, the poppet 42 may be lifted from the seat 55 to permit flow therethrough. Any flow through the conduit 20 passes through contaminant screen 46.

The relief valve seat 58 is held against the sleeve seat face 40 by the bias of a compression spring 65 that is seated within the plug counterbore 54 adjacent the screen 46. The opposite end of the compression spring 65 is seated on a threaded plug 67 around a centering pin 69. Manual rotation of the plug 67 axially translates the spring seat to adjust the bias force exerted by the spring 65 against the plug 50.

Figure 6:
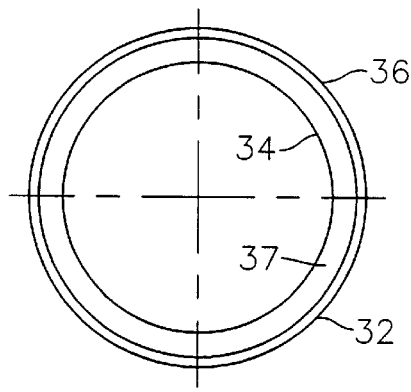
FIG. 6 is an end view of the bypass conduit sleeve insert.
Figure 7:
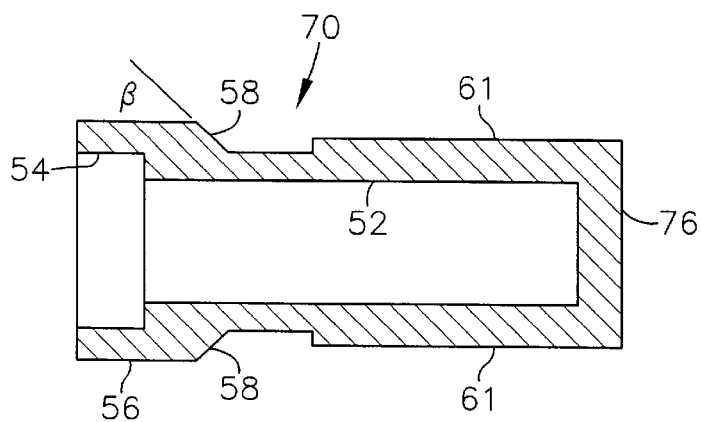
FIG. 7 is an axially sectioned view of the bypass valve plug without the relief poppet.
Figure 8:
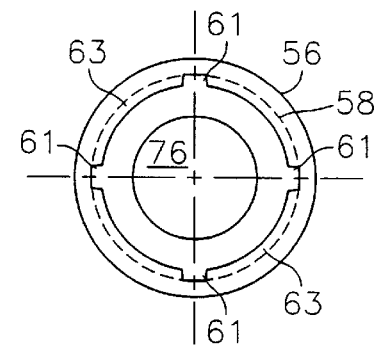
FIG. 8 is an end view of the bypass valve plug.

FIGS. 6 and 7 illustrate an embodiment of the invention without the suction-to-discharge bypass capacity of the poppet valve 42. The FIGS. 7 and 8 configuration of the invention provides only over pressure protection. In this case, the center bore 52 of the bypass plug 70 terminates with a solid end wall 76. Other external features of the bypass plug 70 such as the valve seat 58 and rib guides 61 remain the same. The pressure preloading spring 65 seats within the plug 70 counterbore 54 to bias the valve seat 58 into sealing engagement with the valve seat face 40. The degree of spring 65 compression against the plug 70 is determined by the degree of screw lead advancement given the threaded plug 67 toward the valve plug 70. In consequence, the pressure differential between suction port 16 and discharge port 18 at which the valve plug 70 will open is determined by the degree of spring 65 compression.

The foregoing description of the preferred embodiments of our invention have been presented for purposes of illustration and description. It is not intended to be exhaustive or to limit the invention to the precise forms disclosed. Obvious modifications or variations are possible in light of the above teachings. The embodiments were chosen and described to provide the best illustration of the principles of the invention and its practical application and to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

What is claimed is:

1. A method of fabricating a pump comprising the steps of:
   providing a fluid flow conduit in a pump housing between a pump suction chamber and a discharge chamber;
   providing a first counterbore coaxially about said conduit with a first inside diameter and a first axial depth from said suction chamber;
   providing a second counterbore coaxially about said conduit with a second inside diameter less than said first inside diameter and a second axial depth measured from an axial depth end of said first counterbore;
   providing a substantially cylindrical sleeve element having an annular wall between a sleeve inside diameter and a sleeve outside diameter, said sleeve having an axial length greater than said second axial depth and a sleeve outside diameter corresponding to said second counterbore inside diameter;
   securing said sleeve within said second counterbore to project an excess sleeve length coaxially within said first counterbore thereby providing an unrestricted annular space between said sleeve outside diameter and said first counterbore inside diameter; and,
   providing a valve seating surface on the projected axial end of said sleeve.

2. A method as described by claim 1 further comprising the step of providing a polymer valve plug to sealingly engage said valve seating surface.

3. A method as described by claim 2 further comprising the step of resiliently biasing said valve plug against said valve seating surface.

4. A method as described by claim 1 wherein said excess sleeve length is about 40% or less than said sleeve outside diameter.

5. A method as described by claim 4 wherein said excess sleeve length is about 20% to about 40% of said sleeve outside diameter.

6. A method as described by claim 1 wherein the axial length of said sleeve is about 30% or greater than said second axial depth.

7. A method as described by claim 1 wherein said sleeve is secured within said second counterbore by a pressfit assembly.

8. A method as described by claim 1 wherein said sleeve is secured within said second counterbore by a threaded assembly.

9. A method of fabricating a pump comprising the steps of:
   providing a fluid flow conduit in a pump housing between a pump suction chamber and a discharge chamber;
   providing a first counterbore coaxially about an axis of said conduit with a first inside diameter along a first axial depth from said suction chamber to an inner axial end;
   providing a receptacle socket within and along said conduit from the inner axial end of said first counterbore away from said suction chamber;
   providing a sleeve element having a substantially cylindrical outside diameter at one axial end thereof, said one axial end having an outside diameter less than said first counterbore inside diameter, an axially opposite end of said sleeve being formed to engage said receptacle socket whereby said sleeve one axial end projects into said first counterbore to form an annular space between said outside diameter of said sleeve one axial end and the first counterbore inside diameter; and,
   providing a valve seating surface on the projected one axial end of said sleeve.

10. A method as described by claim 9 further comprising the step of providing a polymer valve plug to sealingly engage said valve seating surface.

11. A method as described by claim 10 further comprising the step of resiliently biasing said valve plug against said valve seating surface.

12. A method as described by claim 9 wherein said sleeve opposite end is pressed into said receptacle socket.

13. A method as described by claim 9 wherein said axially opposite end of said sleeve is threaded into said receptacle socket.

14. A method as described by claim 9 wherein said sleeve element has a length between said one axial end and said axially opposite end that is about 30% or greater than an axial length of said receptacle socket.

15. A method as described by claim 9 wherein said sleeve element one axial end projects into said counterbore by an axial distance that is about 40% or less than said sleeve outside diameter.

16. A method as described by claim 15 wherein said sleeve element one axial end projects into said counterbore by an axial distance that is about 20% to about 40% of said sleeve outside diameter.

* * * * *